United States Patent
Steffan et al.

[11] Patent Number: 6,144,133
[45] Date of Patent: Nov. 7, 2000

[54] DIRECT CURRENT ELECTROMOTOR

[75] Inventors: Joachim Steffan, Giswil; Hansruedi Wenger, Sachseln; Andre Halter, Giswil, all of Switzerland

[73] Assignee: Interelectric AG, Sachseln, Switzerland

[21] Appl. No.: 09/149,971

[22] Filed: Sep. 9, 1998

[30] Foreign Application Priority Data

Sep. 15, 1997 [DE] Germany .......................... 197 40 551

[51] Int. Cl.⁷ .......................... H02K 13/10; H02K 13/14; H02K 11/02
[52] U.S. Cl. .................................. 310/220; 310/40 MM; 310/23.3
[58] Field of Search .................................. 310/68 R, 72, 310/40 MM, 220, 221, 222, 233, 235, 51

[56] References Cited

U.S. PATENT DOCUMENTS

| | | | |
|---|---|---|---|
| 3,594,598 | 7/1971 | Schuab | 310/220 |
| 3,924,148 | 12/1975 | Tachibana et al. | 310/220 |
| 4,322,650 | 3/1982 | Mabuchi | 310/220 |
| 5,296,771 | 3/1994 | Sakuma et al. | 310/220 |
| 5,473,212 | 12/1995 | Crook et al. | 310/221 |
| 5,717,270 | 2/1998 | Lau et al. | 310/220 |

FOREIGN PATENT DOCUMENTS

| | | |
|---|---|---|
| 0714 159A2 | 5/1996 | European Pat. Off. . |
| 3300313 A1 | 10/1983 | Germany . |
| 53-147904 | 12/1978 | Japan .................................. 310/221 |
| 55-41139 | 3/1980 | Japan .................................. 310/220 |
| 56034200 | 9/1982 | Japan . |

OTHER PUBLICATIONS

European Search Report from corresponding European patent application.
Article appearing in "Machine Design" Feb. 22, 1990.

*Primary Examiner*—Clayton LaBalle
*Attorney, Agent, or Firm*—Tilton, Fallon, Lungmus & Chestnut

[57] ABSTRACT

A direct current electromotor, having in particular small dimensions, comprising a collector plate arranged on a shaft, a plurality of collector wires held by the collector plate plate and accumulated to a collector sleeve, and comprising a capacitor disk also arranged in the area of the collector plate, the contact pads of the capacitor disk are each in electrical connection to at least one associated collector wire in a respective coordination. A direct current motor of this kind shall have a more simple structure so that very small diameters can also be produced. This is achieved in that the capacitor disk with its contact pads is directly set onto the collector wires and is connected therewith.

8 Claims, 5 Drawing Sheets

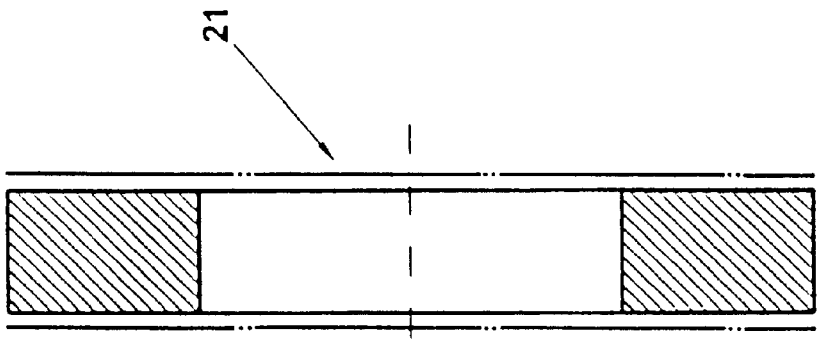
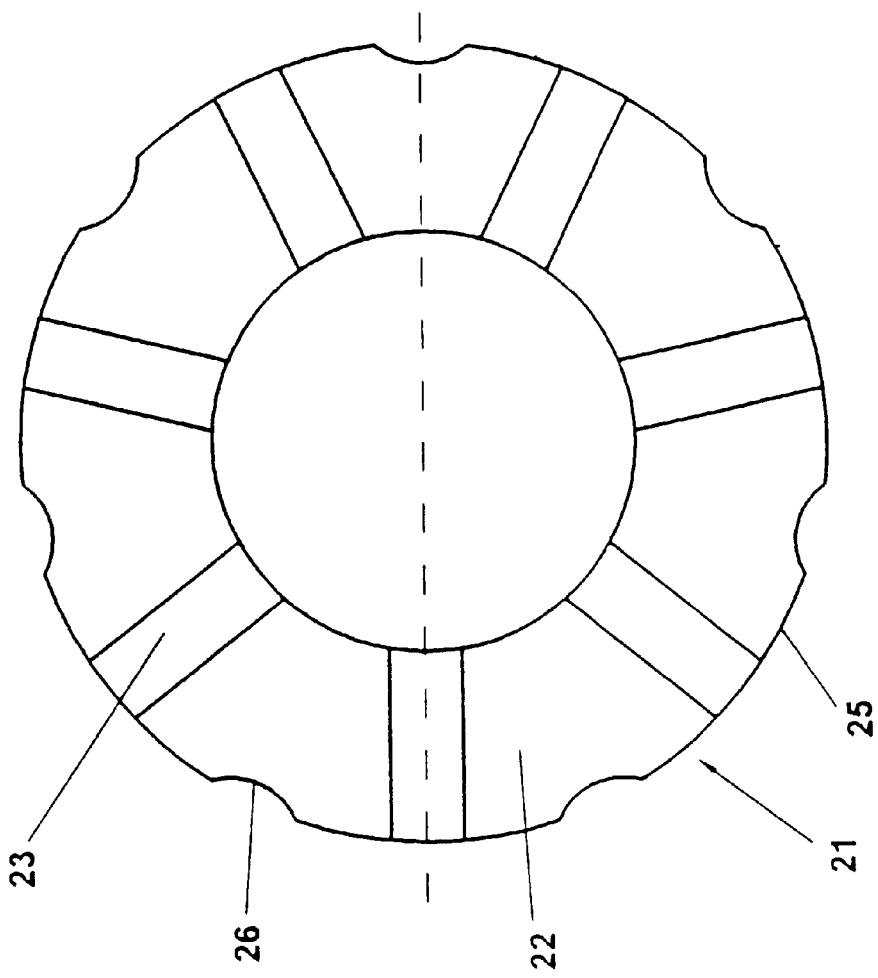

DIRECT CURRENT ELECTROMOTOR

BACKGROUND OF THE INVENTION

The present invention refers to direct current electromotors, in particular direct current electromotors having small dimensions, comprising a collector plate attached to a shaft, a plurality of collector wires held by the collector plate and accumulated to a collector sleeve, and a capacitor disk also arranged in the region of the collector plate, the contact pads of which each are in an electrical connection to at least one associated collector wire in a respective coordination.

Direct current electromotors of that kind having capacitor disks are used where a prolongation of the motor life is assumed, since the use of the capacitor disk leads to less formation of sparks at the collector. Capacitor disks of that kind (e.g. CLL disks) are mostly made of a special ceramic material and comprise suitable contact pads. In the formerly used constructions, the collector plate was put from the front onto the collector plate and a connection was enabled by a separate wiring between the collector wires and the contact pads of the capacitor disk. In a further embodiment of the prior art, it is provided that the capacitor disk was set onto the rear side of the collector plate and that the capacitor disk has star-shaped connection wires, which were bent forwardly over the outer circumference of the collector plate so that they were brought into contact with the collector wires.

A decisive disadvantage of this construction is amongst others that it is not suitable for use in motors having a diameter smaller than 15 mm because of the space required. Moreover, the joining technique between collector wires and capacitor disk requires much effort so that there was an endeavor to simplify the connection.

SUMMARY OF THE INVENTION

Thus, it is the object of the present invention to provide a direct current electromotor of the above-mentioned kind which can also be manufactured with small outer diameters and which has a simple design.

This object is solved in accordance with the invention in that the capacitor disk with its contact pads is directly set onto the collector wires and is connected therewith. Thus, the invention does without additional contacting elements between the capacitor disk and the collector wires and sets the capacitor disk directly onto the collector wires. Through this, the diameter range covered by the collector wires can be used as a space for the capacitor disk. Since in the prior art the separate connection wires were always extended in parallel to the collector wires, this diameter region was only restrictively available.

According to a further embodiment, it is provided that the collector wires are accumulated such that they form the collector sleeve with one section and a connection star with another section joined thereto, wherein the connection star is set onto the capacitor disk. A star of this kind may have any radial configuration so that it can be adapted in any manner whatever to the contact pads of the capacitor disk.

A further advantage is that the capacitor disk is set onto a rear side of the connection star pointing away from the collector sleeve. This has the advantage that the collector wires at the front side may be connected to the winding and the capacitor disk can be arranged within the space enclosed by the winding. Moreover, in such an embodiment the capacitor disk can more easily be connected to the connection wires for the electric connection to the winding, since the entire section of the connection star connected to the capacitor disk can be used.

In order to create a possibly stable and sufficiently precisely positioned connection star, the free ends of the legs of the connection star formed by the individual collector wires can be held by the collector plate. Since the collector wires are usually very filigree in small electromotors, an additional safety means may protect the wires from being accidentally folded at their free ends.

It is preferred in accordance with a further embodiment that the collector plate has an annular recess arranged coaxially with respect to the shaft, into which the annular capacitor disk is inserted. Through this the capacitor disk is completely integrated into the collector plate so that a space-saving arrangement is created. Moreover, the collector plate offers the opportunity of a precise positioning by a respective precise configuration of the annular groove to align the capacitor disk by similar measures at the collector plate.

The collector wires may comprise a leg extending substantially in parallel to the shaft, said leg being part of the collector sleeve, and a leg extending substantially perpendicular thereto, said leg being part of the connection star. Through this the collector wires have an L-shape, which is very simple to manufacture and enables the accumulation to a collector sleeve by a relatively simple arrangement and which at the same time enables the formation of the connection star. The perpendicularly extending leg then points radially outwardly thus causing the spacings between these perpendicular legs to enlarge towards the outside and thus providing a sufficient insulation between these legs.

In an advantageous manner it can further be provided that the collector sleeve is arranged on the front side and the recess is arranged on the rear side of the collector plate, wherein the connection star extends into the recess. Through this the advantages can be achieved in combination with the configuration of the collector plate that the capacitor disk is arranged within the space enclosed by the winding, wherein the collector wires are held by the collector plate in a manner that a direct contact of the capacitor disk with the collector wires within the recess is directly provided.

In order to enable a favorable connection of the collector wires to the capacitor disk, access openings cutting the recess for accessing the legs of the collector wires forming the connection star can be arranged at the front side of the collector plate. Through this a connection method can for instance be automated, since the connection spot can directly be accessed from the front. In this connection, each collector wire can be associated with an independent access opening, which is arranged at a spacing to the outer edge of the collector plate. Through this the collector plate is divided in spokes-like manner whereby it receives a sufficient stability despite the access openings.

In an embodiment in order to ensure a sufficient alignment of the collector plate and an association of the contact portions with the collector wires, an alignment recess may be provided in the annular recess, said alignment projection engaging into an alignment recess arranged at the capacitor disk.

In an advantageous manner, the alignment projection can furthermore be arranged at a position within the recess, at which the free end portion of a collector wire section at the connection star is held by the collector plate and additionally supports the end portion, wherein the alignment recess is arranged at the outer circumference of the capacitor disk. Thus, this alignment projection fulfills two function. On the one hand the function of a better attachment and support of the free ends of the collector wires so that these wires are sufficiently supported also in case of influence of certain forces, e.g. when connecting the collector wires to the capacitor disk. On the other hand the construction of the capacitor disk is simplified through this, since the capacitor disk usually consists of ceramics and alignment recesses are very hard to manufacture. Through the arrangement of the alignment recess at the outer circumference, this recess can further be manufactured in a simple manner.

It is a further advantage in an alternative embodiment that each free end portion of a collector wire section at the connection terminals is assigned an alignment projection and that the capacitor disk has respectively many alignment recesses. Through this a regular support throughout the entire connection region is provided.

In a favorable manner, the collector plate can be made of plastic injection-molding and the collector wires may at least be partially embedded in the plastic mass. In particular in the manufacture of smaller electromotors, this manufacturing alternative proved to be advantageous, since the collector wires are merely introduced into the mold and form a direct compound with the collector plate by injecting the plastic. Moreover, any configuration of the collector plate and adaptation to the collector wires and the capacitor disk can be implemented by plastic injection-molding.

Embodiments turned out to be especially advantageous in which the collector wires are joined with the contact pads of the capacitor disk by a conductive auxiliary material, in particular solder, solder paste and/or solder glue. The application of such a conductive auxiliary material can be automated very easily and in particular in the alternative in which access openings accessible from the front are arranged at the collector plate, a simplification of the attachment process can be achieved without great effort.

BRIEF DESCRIPTION OF THE DRAWINGS

Embodiments of the present invention are described in detail with reference to the drawings.

FIG. 5 shows a capacitor disk in an enlarged front view, FIG. 6 shows the capacitor disk of FIG. 5 in half section.

DESCRIPTION OF THE PREFERRED EMBODIMENT

Figure 1:
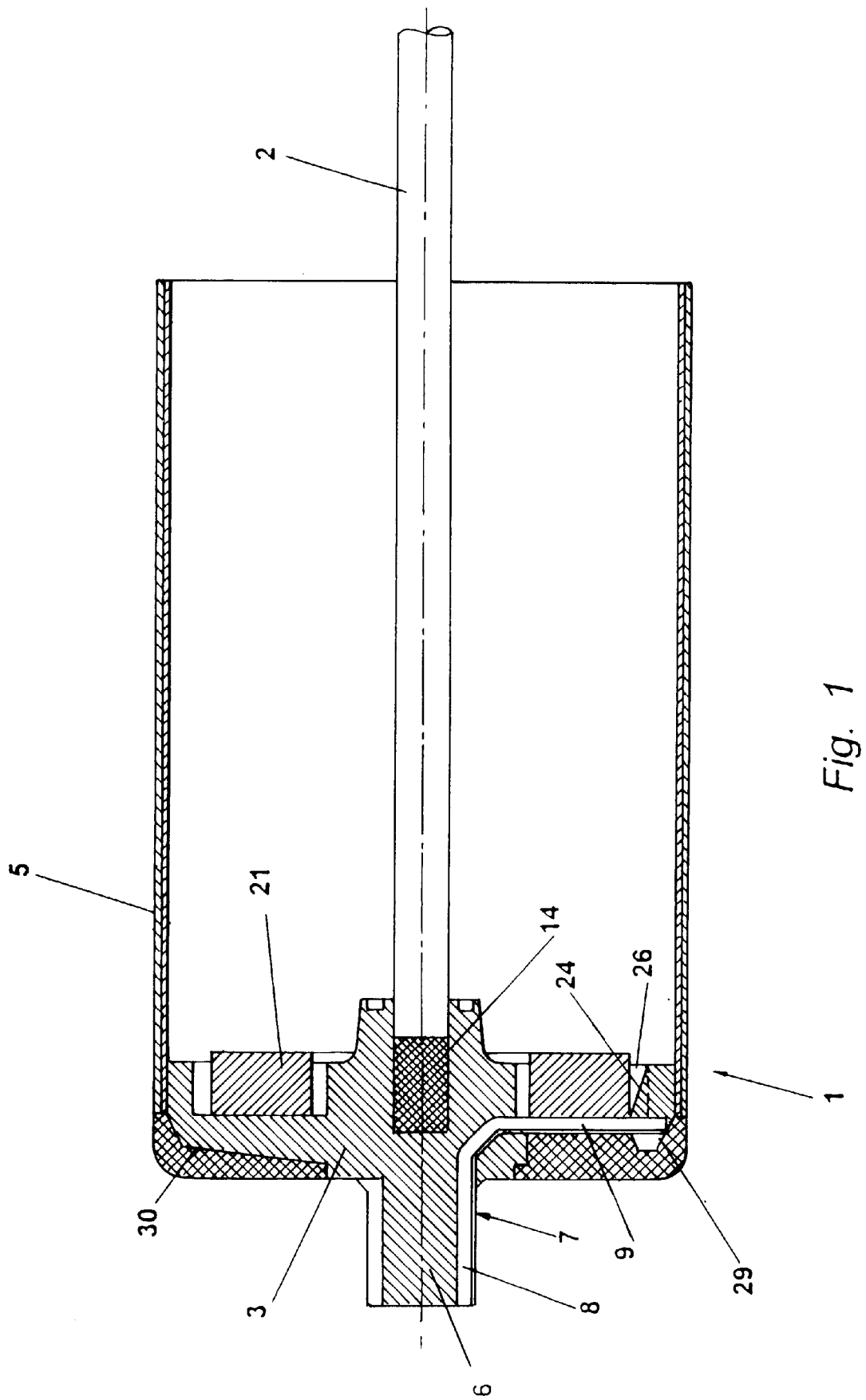
FIG. 1 shows a first alternative of a rotor for a DC electromotor according to the invention.
Figure 2:
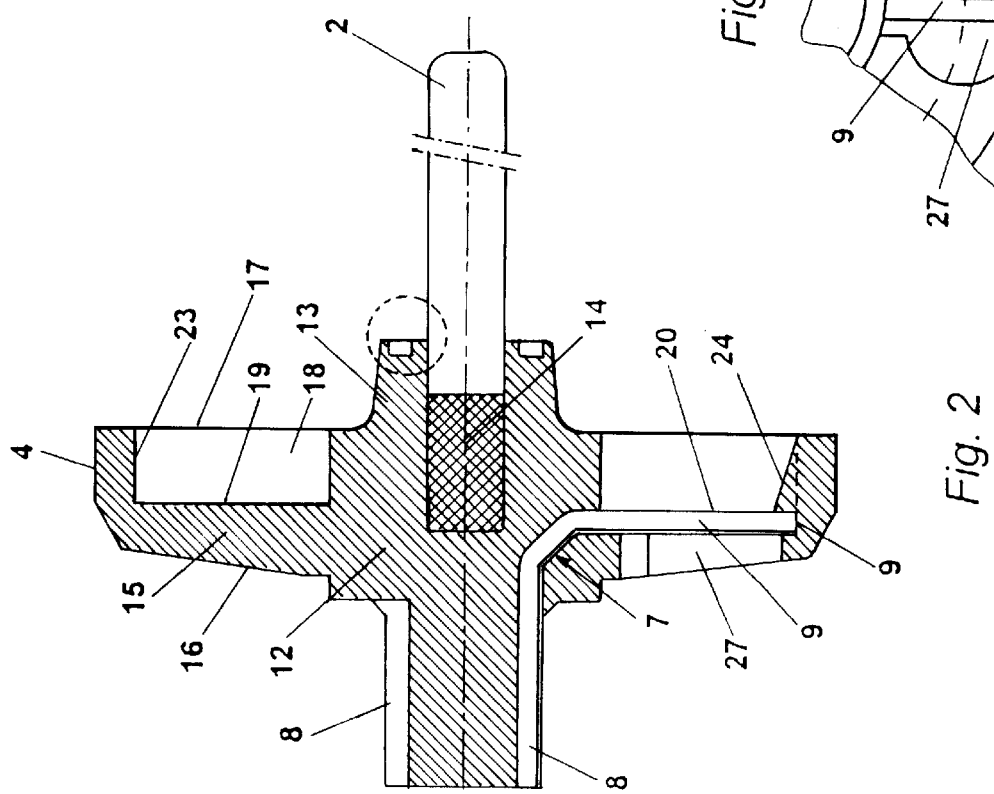
FIG. 2 shows the collector plate with collector wires and an arranged shaft in cross section.

FIG. 1 shows a cage-less rotor 1 for a DC electromotor. The rotor 1 is rotatably arranged in a housing (not shown) having an iron yoke and an internally arranged permanent magnet, said rotor being arranged coaxially to the shaft 2. A plastic collector plate 3 is attached at one end of the shaft 2, with a sleeve-like rotor winding 5 being attached coaxially with respect to the shaft 2 on the cylindrical outer circumferential portion 4 of the collector plate (also see FIGS. 2 to 4). The collector plate 3 comprises a substantially cylindrical projection 6 protruding over the rotor winding 5, with legs 8 of the collector wires extending in parallel to the shaft axis being embedded in said projection. The collector wires 7 also comprise another leg 9 arranged perpendicular with respect to the leg 8, said another leg 9 extending from the shaft axis radially outwards. Through this each collector wire 7 has an approximate L-shape in side view.

Figure 3:
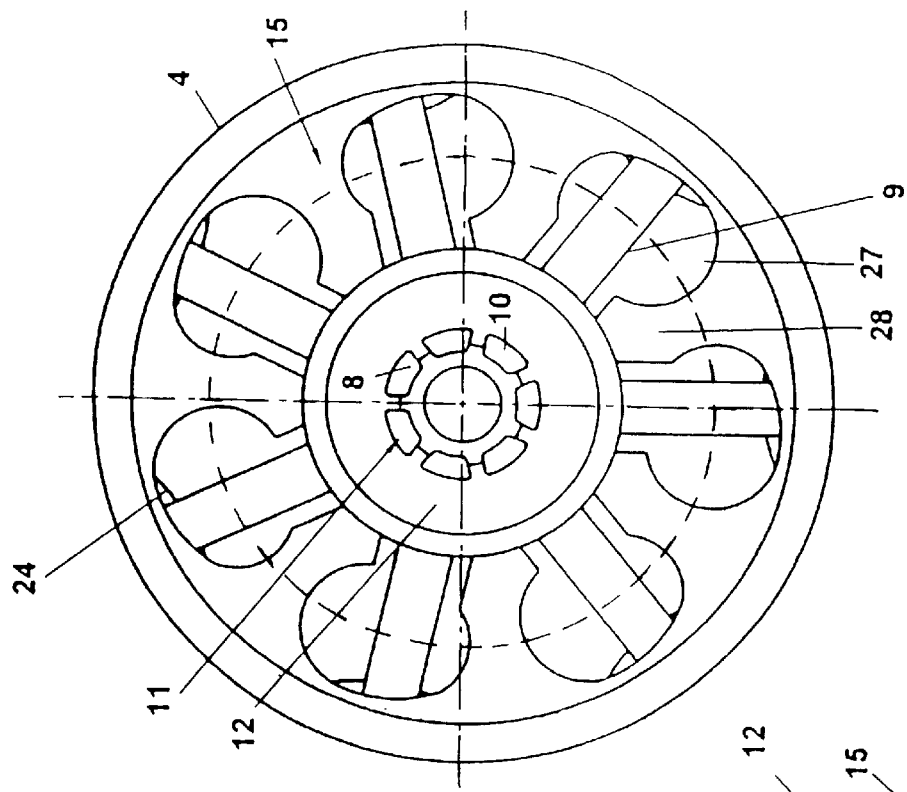
FIG. 3 shows the structure of FIG. 2 in a front view.
Figure 4:
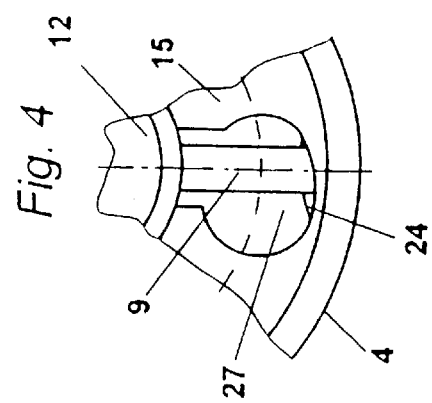
FIG. 4 shows an access opening of the collector plate in an enlarged view.

In the embodiment shown, seven collector wires 7 are evenly distributed at the collector plate 3 in this manner. The parallel legs 8 of the collector wires 7 are embedded into the projection 6 in a manner that the upper side 10 thereof is exposed towards the outside, so that appropriate brushes can be set thereon. The parallel legs 8 of the collector wires 7 therefore form a collector sleeve 11. FIG. 3 also shows that the cross section of the collector wires 7 is substantially trapezoidal, wherein the longer side points towards the outside and defines the outer side 10. The shorter side is fixedly embedded into the projection 6.

Each collector wire 7 extends over the projection 6 into the central portion 12 of the collector plate 3 in which the wires are fully encompassed by plastics. In this central portion 12 the transition of the collector wires 7 from the parallel leg 8 into the vertical leg 9 is also located. The collector plate 3 has a cylindrical shoulder 13 having an accommodation bore, into which a knurled section 14 of the shaft 2 is pressed-in. Through this a connection fixed for co-rotation between the collector plate 3 and the shaft 2 is achieved. The section 15 of the collector plate 3 leading radially towards the outer circumferential portion 4 has a front side 16 pointing away from the rotor winding 5 and a rear side 17 pointing in the direction of the rotor winding 5. An annular recess 18 is formed in the rear side 17 at a distance to the outer circumferential portion 4 and to the cylindrical shoulder 13, said recess being arranged coaxially with respect to the shaft axis. The cross section of the recess 18 is substantially rectangular. The perpendicular legs 9 of the collector wires 7 extend into the bottom 19 of the recess 18, so that the rear sides 20 of the collector wires are arranged as contact pads in the recess 18.

An annular capacitor disk 21 (see FIGS. 5 and 6) is arranged in this recess 18. The capacitor disk 21 consists of a special ceramics and comprises contact pads 22 separated from one another. These contact pads 22 are obtained by silver-plating the surface of the capacitor disk 21. The contact pads 22 are separated from one another by free strips 23. The arrangement of the capacitor disk 21 in the recess 18 (see FIG. 1) is provided such that the contact pads 22 contact the rear side 22 of the associated collector wires 7.

In order to optimally arrange and align the capacitor disk 21 in the recess 18, ramp-shaped alignment projections 24 are regularly provided on the outer wall 23 of the recess 18. The alignment projections 24 are always arranged directly adjacent the free ends 9' of the collector wires 7, since in this portion a material accumulation is produced. On its outer circumference 25 the capacitor disk 21 has alignment recesses 26 distributed regularly and adapted to the shape of the alignment projections 24. The capacitor disk 21 is inserted into the recess 18 in such a manner that the alignment projections 24 precisely inserted into the alignment recesses 26 in the capacitor disk 21.

The collector plate 3 moreover comprises access openings 27 on the front side 16 which are open towards the recess 18, said access openings being designed such that seen from the front side 1, the perpendicular legs 9 and the contact pads 22 of the capacitor disk 21 are visible and accessible. In the embodiment shown, the access opening 27 extends from the central portion 12 radially outwardly to approximately the position at which the free end 9' of the collector wires 7 is embedded into the collector plate 3. Only as much material remains that ensures a safe fixing of the free end 9'. Moreover, the access opening 27 is slightly enlarged laterally, which leads to advantages for the joining technique between the capacitor disk 21 and the collector plate 7. Spokes remain between the individual access openings 27, said spokes connecting the central portion 12 to the outer circumferential portion 4.

The fixed connection between the perpendicular leg 9 of the collector wires 7 and the contact pads 22 of the capacitor disk 1 can be achieved in different manners, e.g. by solder, solder paste or conductive glue.

In the embodiment described, this joining material may be introduced through the access opening 27 from the front side 6 of the collector plate 3. Through this the joining technique is greatly facilitated, since the capacitor disk 21 is merely inserted from the rear side 17 and the connection can be established from the front side by using the respective joining material.

It is in particular evident from FIG. 3 that the arrangement of the perpendicular legs 9 of the collector wires 7 forms a kind of star shape, so that it can be referred to as a connection star, the connection surfaces formed by the rear sides of the perpendicular legs being aligned in parallel to the contact pads 22 of the capacitor disk 21, so that the capacitor disk is merely put onto this surface and then has to be joined by means of an auxiliary material. It would also be conceivable that a mere press-on is implemented if the capacitor disk 21 is fixed appropriately.

It is also evident from FIG. 1 that a connection between the collector wires 7 and the rotor winding 5 is established through respective connection wires 29. Through this the capacitor disk 21 is at the same time connected to the rotor winding 5.

The effect and function of the present invention will now be described more specifically.

By the fact that the capacitor disk 1 can be easily inserted into the recess 18 and is very easily aligned through the alignment recess 26 along with the alignment projections 24, a direct contact between the rear side 9 of the collector wires 7 and the contact pads 22 of the capacitor disk takes place. By introducing a joining material through the access opening 27, a fixed connection between the collector wires 7 and the capacitor disk 21 is produced. This process has severe advantages over the formerly used joining techniques of the prior art, since it is substantially more easy to carry out and is based on a less expensive construction.

Due to the fact that the capacitor disk 21 is located substantially within the diameter portion covered by the collector wires, this joining technique only requires relatively few space. That means that the free ends 9' of the collector wires define a diameter that is larger than the outer diameter of the capacitor disk 21. This in turn leads to the consequence that rotors 1 having extremely small diameters can be manufactured, which in turn leads to electromotors having small diameters. Up to now DC electromotors having capacitor disks 21 with diameters of less than 15 mm could not be manufactured. The present invention now even provides for embodiments of such electromotors with an even smaller diameter. The capacitor disk 21 has the advantage that the life of DC electromotors with an iron-less rotor 1 and collector is greatly increased, since less sparks are generated.

Figure 7:
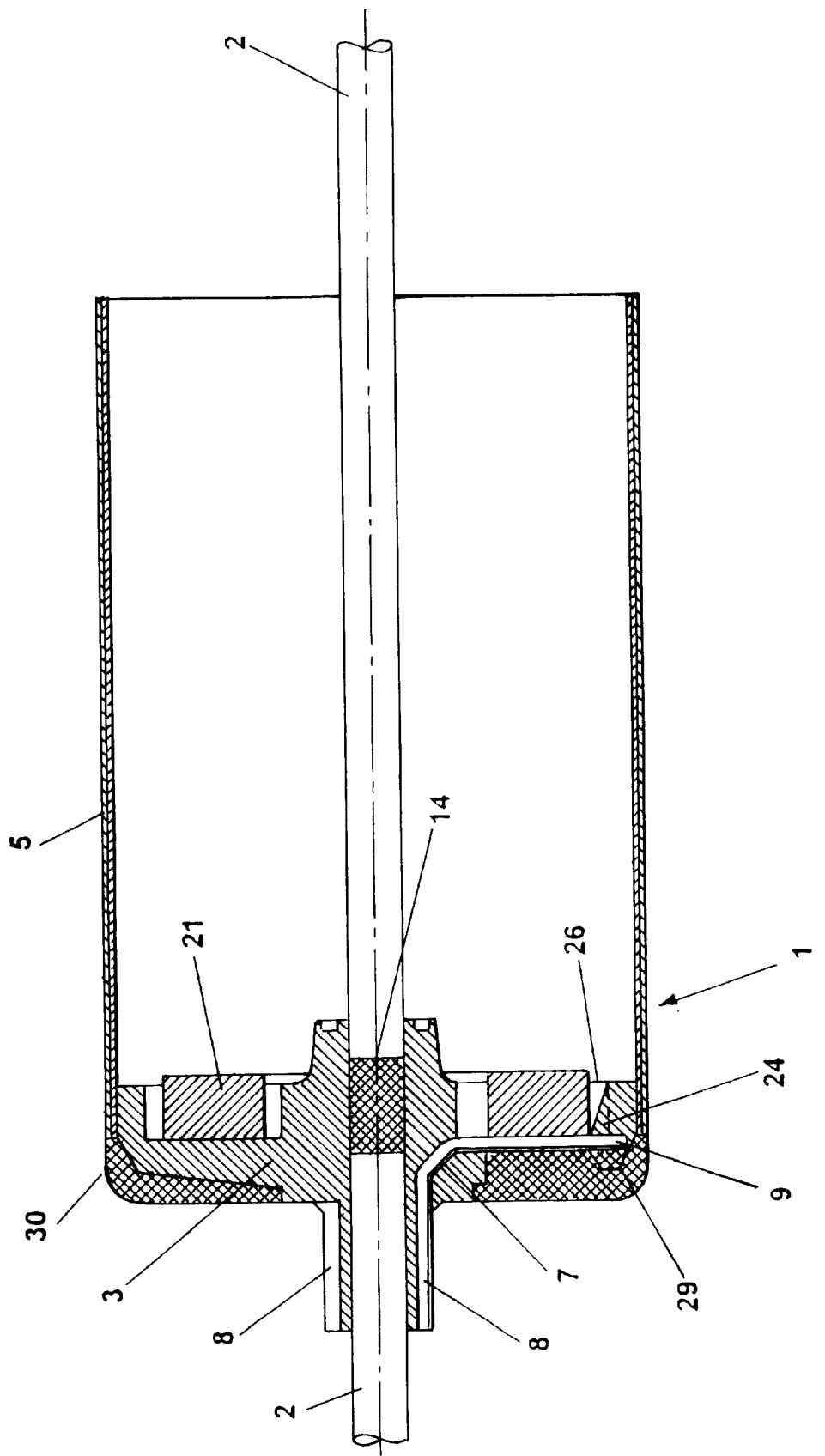
FIG. 7 shows a second embodiment of a rotor for a DC electromotor according to the invention in full section.
Figure 9:
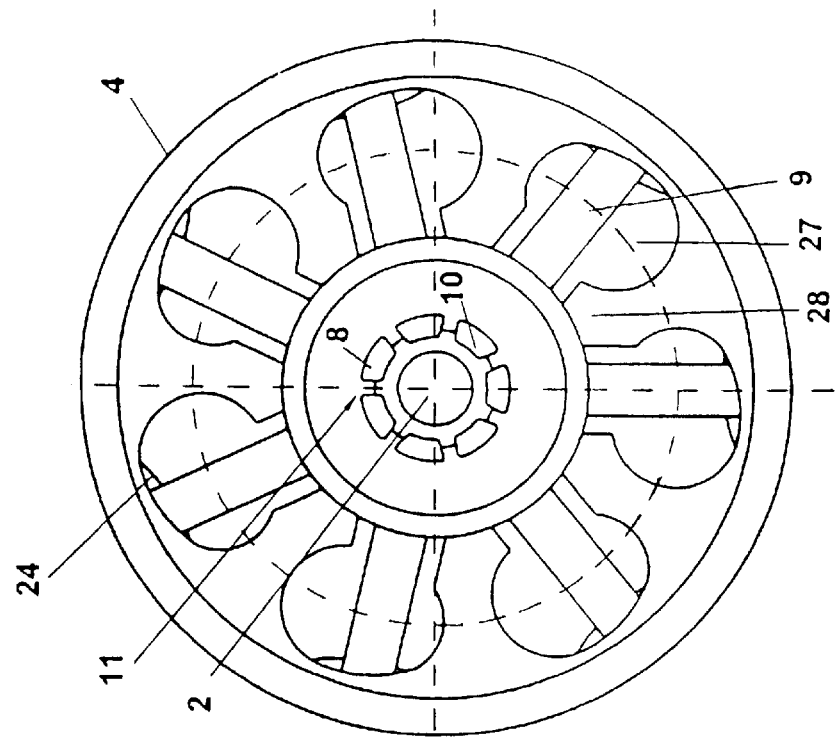
FIG. 9 shows the structure of FIG. 8 in a front view.
Figure 8:
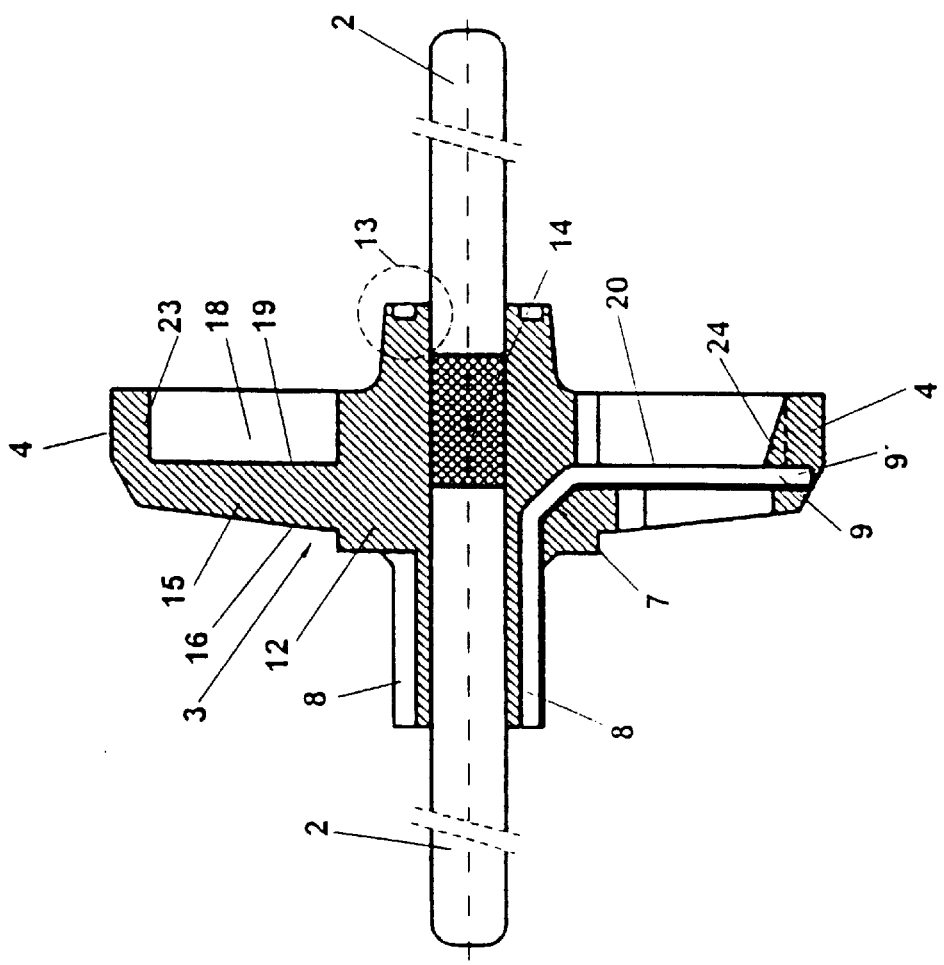
FIG. 8 shows the collector plate with collector wires and the shaft of FIG. 7 in an enlarged view.

A second embodiment of the present invention is now explained with reference to FIGS. 7 to 9. In the following it is only referred to the differences to the preceding embodiment, so that the above description substantially also applies for this embodiment.

The main difference is that the shaft 2 extends through the collector plate 3 and thus through the projection 6, so that the shaft 2 is also arranged within the collector sleeve 11. Through this, a support on the shaft projection shown in FIG. 8 on the left side can for instance also take place. Except for this difference, the remaining configuration is equal to the above described embodiment.

We claim:

1. A direct current electromotor, comprising a collector plate (3) arranged at a shaft (2), a plurality of collector wires (7) held by said collector plate (3) and accumulated to a collector sleeve (11), a capacitor disk (21) arranged in the area of said collector plate (3), said capacitor disk having contact pads (22) in an electrical connection to at least one associated said collector wire (7) in a respective coordination, said collector wires being accumulated such that a section (8) thereof forms said collector sleeve and a section (9) connected thereto forms a connection star, said collector plate (3) comprises an annular recess (18) arranged coaxially with respect to said shaft (2), said capacitor disk (21) being annular and being inserted into said annular recess, the collector sleeve (11) being arranged on a front side (16) of said collector plate (3) and said recess (18) is arranged on a rear side of said collector plate (3), wherein the connection star extends into the annular recess (18), access openings (27) cut said recess (18) for accessing the legs (9) of said collector wires (7) forming said connection star are arranged at the front side (16) of said collector plate (3), and wherein the connection star is set onto the capacitor disk (21) and is connected therewith.

2. A direct current electromotor as claimed in claim 1, wherein an independent access opening (27) is associated with each said collector wire (7), said access opening being arranged at a spacing to the outer edge (4) of said collector plate (3).

3. A direct current electromotor as claimed in claim 1, wherein an alignment projection (24) is arranged in said recess, said alignment projection engaging into an alignment recess (26) arranged at said capacitor disk (21).

4. A direct current electromotor as claimed in claim 3, wherein said alignment projection (24) is arranged at a position within said recess (18) at which the free end portion (9') of a said collector wire section (9) at said connection star is held by said collector plate (3) and additionally supports said free end portion (9'), wherein said alignment recess (26) is arranged at the outer circumference (25) of said capacitor disk (21).

5. A direct current electromotor as claimed in claim 4, wherein said alignment projection (24) is associated to each said free end (9') of said collector wire section (9) at said connection star, and that said capacitor disk (21) has a corresponding number of said alignment recesses (26).

6. A direct current electromotor as claimed in claim 1, wherein said collector plate (21) is made by plastic injection-molding and the collector wires (7) are at least partially embedded into the plastic mass.

7. A direct current electromotor as claimed in claim 1, wherein collector wires (7) are connected to said contact pads (22) of said capacitor disk (21) by means of a conductive auxiliary material, selected from at least one of solder, solder paste, and conductive glue.

8. A direct current electromotor, comprising a collector plate (3) arranged at a shaft (2), a plurality of collector wires (7) held by said collector plate (3) and accumulated to a collector sleeve (11), a capacitor disk (21) arranged in an area of said collector plate (3), and an ironless coil element (5) said capacitor disk having contact pads (22) in an electrical connection to at least one associated said collector wire (7) in a respective coordination, said collector wires being accumulated such that a section (8) thereto forms a connection star, said capacitor disk (21) sitting on a rear side of said connection star and located in an area surrounded by said ironless coil element (5), and said coil element (5) being attached to said collector sleeve (11), whereby said capacitor disk is isolated from external conditions.

* * * * *